United States Patent [19]
Lev et al.

[11] Patent Number: 5,987,327
[45] Date of Patent: *Nov. 16, 1999

[54] METHOD FOR ESTABLISHING COMMUNICATIONS IN WIRELESS COMMUNICATION SYSTEMS HAVING MULTIPLE SWITCHING CENTERS

[75] Inventors: Valy Lev, Buffalo Grove; Kamala D. Urs, Bartlett, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,271
[22] Filed: Sep. 16, 1996
[51] Int. Cl.$^6$ .................................................. H04Q 7/22
[52] U.S. Cl. .......................... 455/445; 455/560; 370/328; 370/349
[58] Field of Search ....................... 455/422, 432, 455/433, 434, 445, 458, 560, 561; 370/328, 349, 396, 397, 401

[56] References Cited

U.S. PATENT DOCUMENTS

5,577,029 11/1996 Lu et al. ............................... 455/445
5,608,779 3/1997 Lu et al. ............................... 455/436

*Primary Examiner*—Andrew M. Dolinar
*Attorney, Agent, or Firm*—Christopher P. Moreno; Jeffrey K. Jacobs

[57] ABSTRACT

A terminating switching center (101–103) receives an initial address message from an originating switching center (101–103). Responsive to the initial address message, the terminating switching center establishes communications with a wireless unit (118–120). When a called party category corresponding to the wireless unit is compatible with a calling party category included in the initial address message, the terminating switching center instructs at least one terminating transcoder (121–123) to operate in a transparent mode. An answer message including the called party category is sent back to the originating switching center. When the calling and called party categories are compatible, the originating switching center instructs at least one originating transcoder (121–123) to operate in a transparent mode. Additionally, communication path identifiers are included in the messages exchanged. In this manner, double transcoding can be eliminated and resources more efficiently used when executing a mobile-to-mobile call.

29 Claims, 5 Drawing Sheets

METHOD FOR ESTABLISHING COMMUNICATIONS IN WIRELESS COMMUNICATION SYSTEMS HAVING MULTIPLE SWITCHING CENTERS

FIELD OF THE INVENTION

The present invention relates generally to wireless communication systems and, in particular, to a method for establishing communications in wireless communication systems having multiple switching centers.

BACKGROUND OF THE INVENTION

Wireless communication systems are known to comprise mobile units (i.e., hand-held portable or in-car mobile radiotelephones) that wirelessly communicate digitally-represented voice signals within sites controlled by site controllers. Often, site controllers communicate with a switching center so that multiple sites can communicate with each other via the switching center. Further still, sites can communicate with each other via two or more switching centers that are in communication with one another. Current switching centers typically route voice signals in non-compressed digital voice formats, e.g., a pulse-code modulation (PCM) format. In contrast, mobile units typically transmit and receive voice signals in the form of compressed digital voice, e.g., data packets created through the use of a vector-sum excited linear predictive (VSELP) voice coder or an Improved Multiband Excitation (IMBE) voice coder.

Transcoders are provided to perform the conversions, when required, between the compressed digital format and the non-compressed digital format and vice versa. A typical example occurs when a land-based telephone, using a non-compressed digital format, communicates with a mobile unit via the switching center. In this situation, compressed digital voice from the mobile unit is converted into the non-compressed digital format by a transcoder associated with the appropriate site controller. The non-compressed digital voice is then routed, via the switching center, to the land-based telephone. When communicating from the telephone to the mobile unit, the process is reversed.

Another situation in which transcoders are used occurs in calls between two mobile units. In this case, compressed digital voice from a first mobile is converted to a non-compressed format by a transcoder and sent through a site controller to a switching center. The switching center, in turn, routes the non-compressed voice possibly to the same site controller or another site controller, which re-converts the non-compressed voice, via another transcoder, to the compressed format. The re-compressed digital voice is then transmitted to the second mobile via the site controller. As known in the art, conversions by a transcoder add delay to the transmission of the message and slightly degrade the resulting quality of the voice. Thus, calls requiring more than one conversion, as in the present example, may be subjected to prohibitive delays and audio degradation.

An attractive solution to this problem is to allow compressed digital voice signals to be transparently passed through the transcoders, and hence through the switching center, when a mobile-to-mobile call is established. In this manner, the delays and audio degradation inherent in the conversion process can be avoided. Transcoders capable of operating in either a transcoding mode (i.e., converting compressed digital voice to non-compressed digital voice) and a transparent mode (i.e., passing compressed digital voice without conversion) are discussed in greater detail in U.S. patent application Ser. No. 08/336,347 filed Nov. 8, 1994 now U.S. Pat. No. 5,608,779, and assigned to the same assignee as the present invention. Assuming that transcoders can operate in this manner, i.e., transparently passing compressed voice, current switching center technology does not provide the necessary control for such operations.

The problem described above is exacerbated when voice messages are required not only to span multiple transcoders, but also to span multiple switching centers. Even if the transcoders affiliated with each switching center are capable of passing compressed digital voice, operations associated with the inter-switching center communication link must be similarly controlled. For example, the echo-cancellation found on most inter-switching center communication links would need to be disabled when passing compressed digital voice. Current methods for controlling the operations of switching centers do not address the need to pass compressed voice between switching centers, i.e., a mobile-to-mobile call is treated similarly to any other type of call. Therefore, a need exists for a method that avoids multiple transcoder format conversions for mobile-to-mobile calls that span multiple switching centers. Such a method should take advantage of opportunities to use reduced-bandwidth resources when available.

DESCRIPTION OF A PREFERRED EMBODIMENT

The present invention provides a method for multiple switching centers to communicate with each other and, in so doing, eliminates the need for multiple format conversions in mobile-to-mobile calls. Furthermore, the present invention incorporates the selection of reduced-bandwidth communication paths when available. In a first embodiment of the present invention, a terminating switching center receives an initial address message from an originating switching center. Responsive to the initial address message, the terminating switching center establishes communications with a wireless unit indicated by the initial address message. When a called party category corresponding to the wireless unit is compatible with a calling party category included in the initial address message, the terminating switching center instructs at least one terminating transcoder to operate in a transparent mode (i.e., no conversion).

In a second embodiment of the present invention, an originating switching center, responsive to a call request, sends an initial address message to a terminating switching center. The initial address message includes a calling party category. When an answer message is received from the terminating switching center, the called party category included in the answer message is compared with the calling party category. When the calling party category is compatible with the called party category, the originating switching center instructs at least one originating transcoder to operate in a transparent mode.

In both the first and second embodiments, communication path identifiers are included in the messages exchanged between the originating and terminating switching centers. The communication path identifiers allow the switching centers to select reduced-bandwidth communication paths when available.

In a third embodiment of the present invention, an intermediate switching center, serving as part of a link between an originating switching center and a terminating switching center, receives and forwards an initial address message to a terminating switching center. Responsive to the initial address message, the intermediate switching center receives an answer message that includes a first communication path identifier that corresponds to a first communication path between the intermediate switching center and the terminating switching center and having reduced-bandwidth. Responsive to the answer message, the intermediate switching center selects the first communication path. In the first, second and third embodiments described above, the ability to modify a call configuration, and possibly the bandwidth required to continue the call, is provided through the use of call modification requests.

Through the three embodiments disclosed herein, the present invention allows switching centers to control the operating modes of transcoders and to select reduced-bandwidth communication paths. In this manner, the present invention eliminates double transcoding and promotes the efficient use of resources when executing a mobile-to-mobile call.

Figure 1:
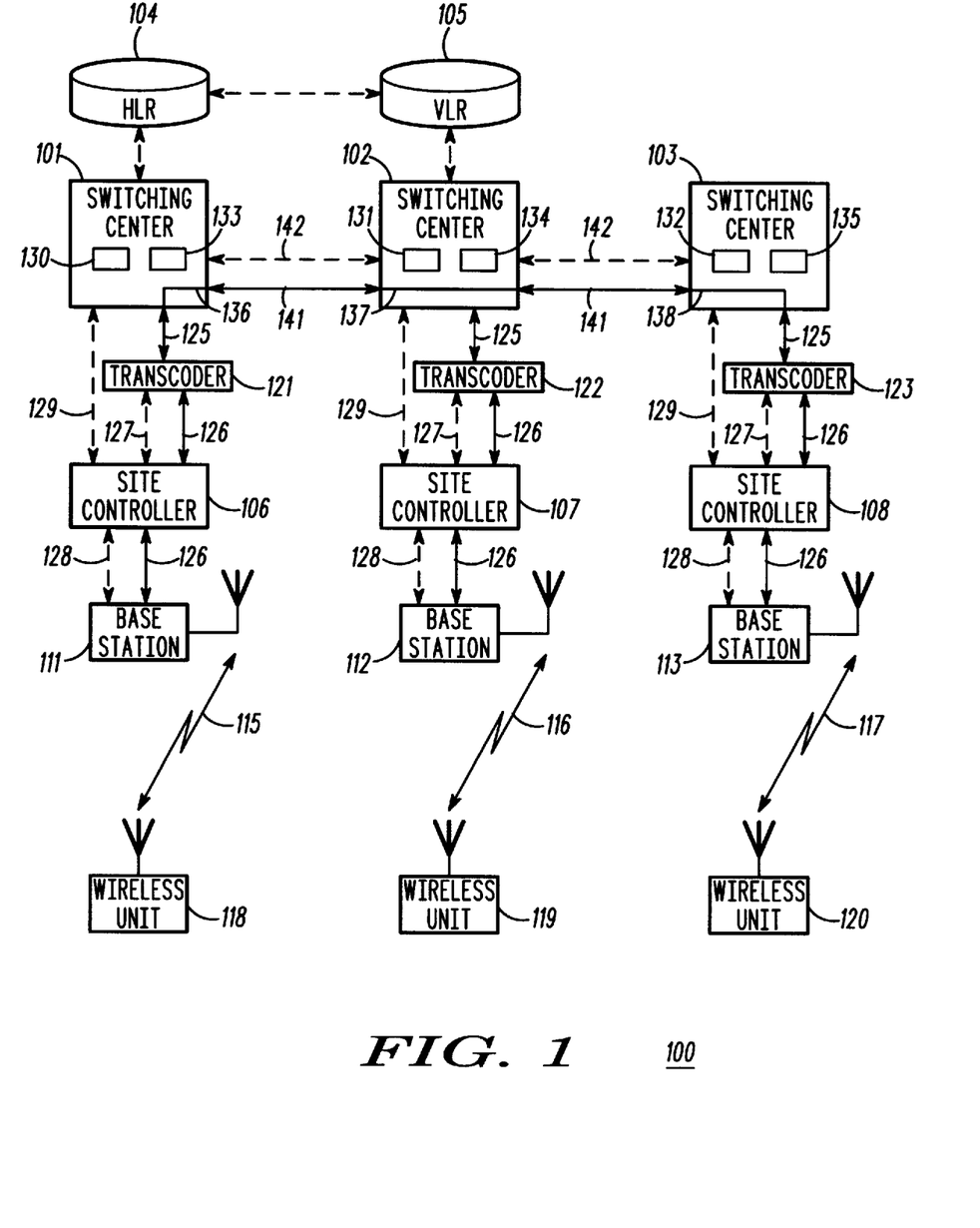
FIG. 1 is a block diagram of a wireless communication system having a multiple switching center configuration.

The present invention may be more fully described with reference to FIGS. 1 through 4. FIG. 1 is a block diagram of a wireless communication system 100 having a multiple switching center configuration. The communication system 100 may comprise a system in conformance with Groupe Speciale Mobile (GSM) standards that is capable of interoperating with systems adhering to other standards. Such a system typically provides communications over a variety of geographic locations, i.e., cities in different states. The communication system 100 comprises switching centers 101–103 in communication with site controllers 106–108 via transcoders 121–123. The site controllers 106–108 control the operations of base stations 111–113, which are in wireless communication, via wireless communication resources 115–117, with a plurality of mobile units 118–120. The switching centers 101–103 each may comprise a Digital Multiplex System Mobile Switching Center (DMS MSC) by Northern Telecom. The site controllers 106–108 and the transcoders 121–123 may comprise Base Station Controllers (BSCs) and transcoders, respectively, manufactured by Motorola, Inc. Additionally, suitable mobile units 118–120 are digital MicroTAC® portable radiotelephones by Motorola, Inc.

Typically, voice information is passed between each switching center 101–103 and its respective transcoder 121–123 via a wired voice link 125 in a non-compressed digital voice format, i.e., a 64 Kbit pulse code modulation (PCM) format. Within each switching center 101–103, the non-compressed digital voice is routed through a respective digital switch matrix 136–138, as known in the art. In contrast, the mobile units 118–120 transceive voice information in the form of compressed digital voice. For example, mobile units in accordance with GSM standards use a regular pulse excitation linear predictive coder (RPE-LPC) having a 13 Kbit format. The wireless communication resources 115–117, which may comprise radio frequency (RF) carriers divided in time into time slots, convey the compressed digital voice between the mobile units 118–120 and their respective base stations 111–113. (Note that the mobile units 118–120 and their corresponding base stations 111–113 may be located in areas separated by large geographic distances, i.e., separate cities in different states.) In turn, the compressed digital voice is sent between the base stations 111–113, site controllers 106–108, and transcoders 121–123 via wired voice links 126.

Each transcoder 121–123 is capable of operating in either a transcoding mode or a transparent mode and each operates under the control of its respective switching center 101–103 and site controller 106–108. In the preferred embodiment, when sending control instructions to a transcoder 121–123, the switching centers 101–103 first send the instructions to the respective site controller 106–108 which in turn send the instruction to the transcoders 121–123. (It is anticipated that configurations in which the switching centers 101–103 communicate control instructions directly to the transcoders 121–123 are also possible.) Wired control links 127, 129 are provided between the switching centers 101–103 and their respective site controllers 106–108 as well as the site controllers 106–108 and their respective transcoders 121–123. Wired control links 128 are also provided between the site controllers 106–108 and the base stations 111–113. Note that the wired voice links 125–126 and the wired control links 127–129 typically comprise Public Switched Telephone Network (PSTN) resources, such as T1 telephone lines, as known in the art. Also, note that the transcoders 121–123 may be provided as part of the site controllers 106–108 (i.e., individual circuit boards within the controller hardware), or they may be provided as separate physical entities apart from the site controllers 106–108.

Each switching center 101–103 includes at least one processing device 130–132 (such as microprocessors, digital signal processors, etc.) and at least one digital memory device 133–135 (such as random-access memory, read-only memory, disk drives, etc.) which can be used to store and execute software algorithms, including any software algorithms used to implement the present invention. Furthermore, the memory 133–135 of each switching center 101–103 can be used to store information regarding the operating modes of their respective transcoders 121–123. The switching centers 101–103 communicate via wired voice links 14,1 and wired control links 142, i.e., T1 telephone lines. In the present invention, the wired voice links 141 convey non-compressed as well as compressed digital voice between the switching centers 101–103. Additionally, the present invention anticipates that the wired voice links 141 may comprise links of various bandwidth (i.e., throughput) capabilities. Of particular importance to the present invention, the wired control links 142 are used by the switching centers 101–103 to convey various control messages that allow the switching centers 101–103 to determine when a mobile-to-mobile call is being established. As a result, the present invention allows the switching centers 101–103 to control the operating modes of the transcoders 121–123 and to select lower-bandwidth resources (i.e., wired voice links 141) between switching centers 101–103 when possible.

Home location registers (HLRs) 104 and visiting location registers (VLRs) 105 are also provided. Although only one home location register 104 and visiting location register 105 are shown in FIG. 1 for clarity, the switching centers 101–103 each have access to associated home and visiting location registers.

Additionally, the HLRs 104 and VLRs 105 communicate with each other, as known in the art. Each of the HLRs 104 and VLRs 105 include information regarding the service provisions (e.g., features) and location for their associated mobile units 118–120. Additionally, each of the HLRs 104, VLRs 105, and memories 133–135 contain so-called global title translation tables. The global title translation tables associate mobile units, based on mobile unit identification information, with unique address information of the switching centers 101–103, HLRs 104, and VLRs 105.

Figure 2:
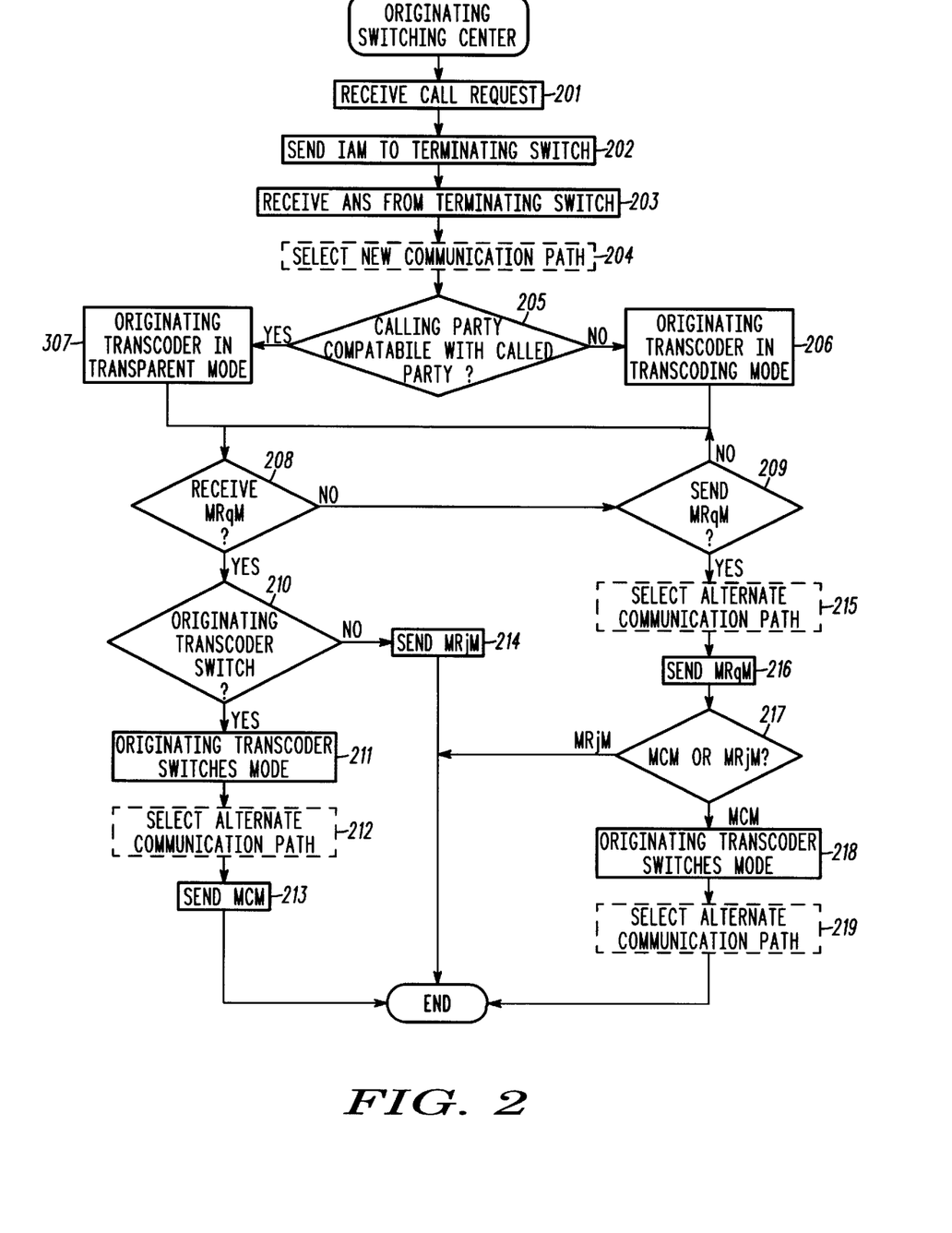
FIG. 2 is a flowchart of a method, in accordance with the present invention, for use by an originating switching center.

FIG. 2 is a flowchart of a method, in accordance with the present invention, for use by an originating switching center. For the purposes of discussion regarding FIG. 2 the following is assumed: the switching center identified by reference numeral 101 is the originating switching center (OSC), the transcoder identified by reference numeral 121 is the originating transcoder, the switching center identified by reference numeral 102 is the terminating switching center (TSC), the mobile unit identified by reference numeral 118 is the calling party, and the mobile unit identified by reference numeral 119 is the called party.

At step 201, the OSC receives a call request sourced by the calling party. The call request is typically passed as a control message to the OSC. In practice, identification of the calling party is typically included in a message used for authentication purposes prior to the call request. After authentication is done, the call request can be made. The call request includes an identification (typically in the form of dialed digits) of the called party. Because the calling party is communicating with the OSC through the base station 111 and site controller 106, the OSC knows that the calling party is a mobile unit. In practice, the OSC takes the identification of the called party and puts it through translation, as known in the art. Depending on how the tables in the OSC have been configured, the translation may or may not identify the called party as a mobile. If the called party is identified as a mobile, the OSC queries the HLR 104 (which in turn queries the VLR 105 for a roaming number) to identify the TSC. If the called party is not identified as a mobile, translations will identify a trunk for routing the call. Regardless, an outcome of the translation process is that another switching center with which the called party is associated (the TSC) is identified.

Responsive to the call request, the OSC sends an initial address message (IAM) to the TSC at step 202. In the preferred embodiment, the IAM (along with the answer message, modification request message and modification complete message discussed below) is a modified form of signaling used in the American National Standards Institute (ANSI) version of the Signaling System Seven (SS7) interface protocol. Furthermore, it is understood that these messages can be added to the signaling set established in the Consultative Committee on Telephony and Telegraphy (CCITT) version of SS7. The IAM used in the present invention includes an identity of the called party and a calling party category that describes a particular type of wireless mobile, e.g., a GSM subscriber, a digital cellular unit, etc. Furthermore, the IAM also includes, in the preferred embodiment, a requested information transfer rate indicative of the minimum required bandwidth required to properly complete the service requested by the calling party. For example, if the call request is for a voice-only communication, a relatively lower bandwidth is required; if the call request is for a data transfer, a higher bandwidth may be required. Refining this example further, compressed digital voice generally requires less bandwidth than non-compressed digital voice.

When sending the IAM, the OSC establishes a communication path between the OSC and the TSC and identifies the communication path to the TSC, which communication path is capable of full-bandwidth transfers, e.g., 64-Kbit, as known in the art. A full-bandwidth communication path is initially chosen because, at this point, it is not known whether reduced-bandwidth communications, as might be required for a mobile-to-mobile call, are possible.

At step 203, the OSC receives an answer message (ANS) comprising a called party category from the TSC. As described below, the ANS is sent by the TSC after the TSC has successfully contacted the called party. Similar to the calling party category included with the IAM, the called party category describes a particular type of wireless mobile. Additionally, in the preferred embodiment, the ANS includes a negotiated information transfer rate and a communication path identifier. The negotiated information transfer rate reflects the minimum bandwidth requirements for the called party to complete the service. In the preferred embodiment, the negotiated information transfer rate will indicate a bandwidth requirement less than the full possible bandwidth when the call is a mobile-to-mobile call. The communication path identifier sent with the ANS identifies a communication path that is to be used to complete the call. In the preferred embodiment, the communication path identifier comprises a Circuit Identity Code (CIC), as known in the art. If the communication path identifier corresponds to the communication path originally established by the OSC, no further action is required. If, however, the communication path identifier corresponds to a new communication path, the OSC, at step 204, selects the new communication path by switching from the old communication path to the new communication path. In the preferred embodiment, the new communication path has a reduced-bandwidth capability, e.g., less than 64-Kbit, which reduced-bandwidth is dependent upon the particular voice compression technique to be used for the call.

Regardless of whether a new communication path was selected, the OSC determines whether the calling party category is compatible with the called party category at step 205. In the context of the present invention, a first category is compatible with a second category if the compressed digital format used to represent voice in the first category can be intelligibly decoded in the same manner (i.e., without the need for an intermediate conversion) as the compressed digital format used to represent voice in the second category. For example, both the calling party and the called party, as identified by their respective categories, could use VSELP vocoders and hence, would be compatible with each other. Conversely, an incompatibility would result if the calling party category required VSELP-based voice and the called party required IMBE-based voice. The present invention anticipates that it may be possible in the future for normally incompatible voice coding techniques to be made compatible to the extent that a minimum level of voice quality is maintained, thereby increasing the flexibility of the present invention.

If the calling party category is not compatible with the called party, the OSC will instruct the originating transcoder (assigned to this particular communication) to operate in a transcoding mode at step 206. In the preferred embodiment, the originating transcoder operates in the transcoding mode by default. In the transcoding mode, the originating transcoder converts the compressed digital voice received from the calling party (inbound) into non-compressed digital voice for transmission via the switching centers. Additionally, any non-compressed digital voice destined for the calling party (outbound) will be converted to the compressed format.

If, however, the calling party category is compatible with the called party, the OSC will instruct the originating transcoder to operate in a transparent mode at step 207. In the transparent mode, the originating transcoder performs no conversions, but rather passes compressed digital voice (in either the inbound or outbound directions) through without any changes. U.S. patent application Ser. No. 08/336,347 describes a technique whereby compressed digital voice may be conveyed through switching centers that normally operate on non-compressed digital voice only. At this point, the OSC has successfully established the communication and, if possible, identified the mobile-to-mobile nature of the communication through the use of the enhanced IAM and ANS.

Regardless of the compatibility, the OSC determines at steps 208 and 209 whether a change in the call configuration has occurred, for example, through the addition of a conference bridge or a land-based party, etc. In particular, it is determined whether a modification request message (MRqM) has been received from the TSC at step 208, or whether a MRqM needs to be sent by the OSC at step 209. Any MRqM sent by the OSC to the TSC, and vice versa, includes a modified configuration indicator that indicates the type of modification requested. In the preferred embodiment, the modified configuration indicator comprises a bit field in which individual bits indicate "no transition", a "wireless to wireline transition", a "wireline to wireless transition", or a "wireless to wireless transition". A "wireless to wireline transition" would be indicated whenever a land-based party or equipment (i.e., a typical deskset telephone or a conference bridge) is added to the call configuration. Conversely, the "wireline to wireless transition" would be indicated whenever the call configuration changes such that no land-based party or equipment is required, leaving only a wireless party at the pertinent switching center. The "wireless to wireless transition" would be indicated when parties to the call are changed (by virtue of call waiting or call transfer, for example) resulting in a different type of called/calling party category.

In addition to the modified configuration indicator, the MRqM can optionally include a called/calling party category (if a different type of called/calling party category resulted from call waiting or call transfer), an alternate communication path identifier and/or an alternate information transfer rate. The alternate communication path identifier (preferably in the form of a CIC) is sent whenever a new communication path has been selected in response to the change in configuration. The alternate information transfer rate is sent if the change in call configuration requires a change in the minimum required bandwidth.

If a MRqM has been received by the OSC, it is determined at step 210, first, whether the originating transcoder needs to switch operating modes as a result of the MRqM and, second, whether the originating transcoder can switch operating modes. The need for the originating transcoder to switch operating modes is determined by the modified configuration indicator discussed above, with the called/calling party category indicating the particular change required. The determination whether the originating transcoder can change operating modes is dependent upon the current state of the call. More particularly, it is dependent upon the services currently being provided in the call and whether such services can be maintained in light of the requested modification. For example, if the originating and terminating transcoders are operating in a transcoding state, and the TSC determines that it can switch back to transparent mode because a change in call waiting left only wireless parties, it may send a MRqM to reflect this change. However, if the OSC is currently servicing land-based and wireless parties for the call because, for example, it is currently providing call waiting for the wireless party, it can not honor the request to switch to transparent operation. It is recognized that other, similar scenarios could arise.

If the originating transcoder does not need to change due to the MRqM, or if the originating transcoder is unable to change, then no changes are made and a modification reject message (MRJM) is sent by the OSC to the TSC at step 214. The MRjM can include the established information transfer rate and communication path identification, as well as a modified configuration indicator in which the "no transition" is indicated; in the preferred embodiment, all are included.

If necessary and possible, based upon the determination made at step 210, the originating transcoder changes operating modes at step 211. Thus, if the originating transcoder were previously operating in the transparent mode, it changes to the transcoding mode at step 21 1, and vice versa. Optionally, at step 212, the OSC can also select (switch to) an alternate communication path identified by the alternate communication path identifier included in the MRqM received at step 208.

Regardless of whether an alternate communication path is selected, the OSC sends, at step 213, a modification complete message (MCM) to the TSC. The MCM at least indicates to the TSC that the OSC is capable of continuing the existing communication in accordance with the changes necessitated by the MRqM. In a preferred embodiment, the MCM includes the modified configuration indicator and the alternate information transfer rate included in the MRqM. Additionally, if the alternate communication path was selected at step 212, then the alternate communication path identifier is also included in the MCM; otherwise, an identifier corresponding to the existing communication path is sent.

Rather than receiving a MRqM, the need to send a MRqM can be detected at step 209. The need to send a MRqM arises, as described above, whenever the configuration of the communication needs to be changed, e.g., through the addition or deletion of a land-based party to the communication. If a MRqM is to be sent, the OSC optionally determines, at step 215, whether an alternate communication path is available for use. As described above, the MRqM will include a modified configuration indicator and, optionally, an alternate information transfer rate and an alternate communication path identifier corresponding to any alternate communication path identified in the previous step. The alternate information transfer rate, if necessary, is determined according to predetermined information stored in the OSC and indexed according to the configuration required. That is, the predetermined information would reflect that a given transcoding state (resulting from the requested change in call configuration) requires so much bandwidth to carry the compressed or non-compressed voice. The MRqM thus formed is then sent to the TSC at step 216.

Responsive to the MRqM, the OSC receives, at step 217, either a MCM or a MRjM from the TSC. The process whereby the TSC responds with either a MCM or a MRjM is essentially equivalent to steps 210–214 described above. If a MRjM is received, the OSC knows that the TSC was unable to accommodate the requested configuration change and does not instruct the originating transcoder to switch modes.

If a MCM is received, the OSC knows that the TSC was able to accommodate the requested configuration change and subsequently instructs the originating transcoder to switch modes at step 218. Optionally, at step 219, the OSC can also select (switch to) an alternate communication path identified by the alternate communication path identifier included in the MCM received at step 217. In the preferred embodiment, the alternate communication path identified in the MCM would not be different from that identified in the original MRqM. Using the above described method, the present invention allows an originating switching center to control the behavior of a transcoder involved in an inter-switching center communication, as well as select reduced-bandwidth communication paths when possible.

Figure 3:
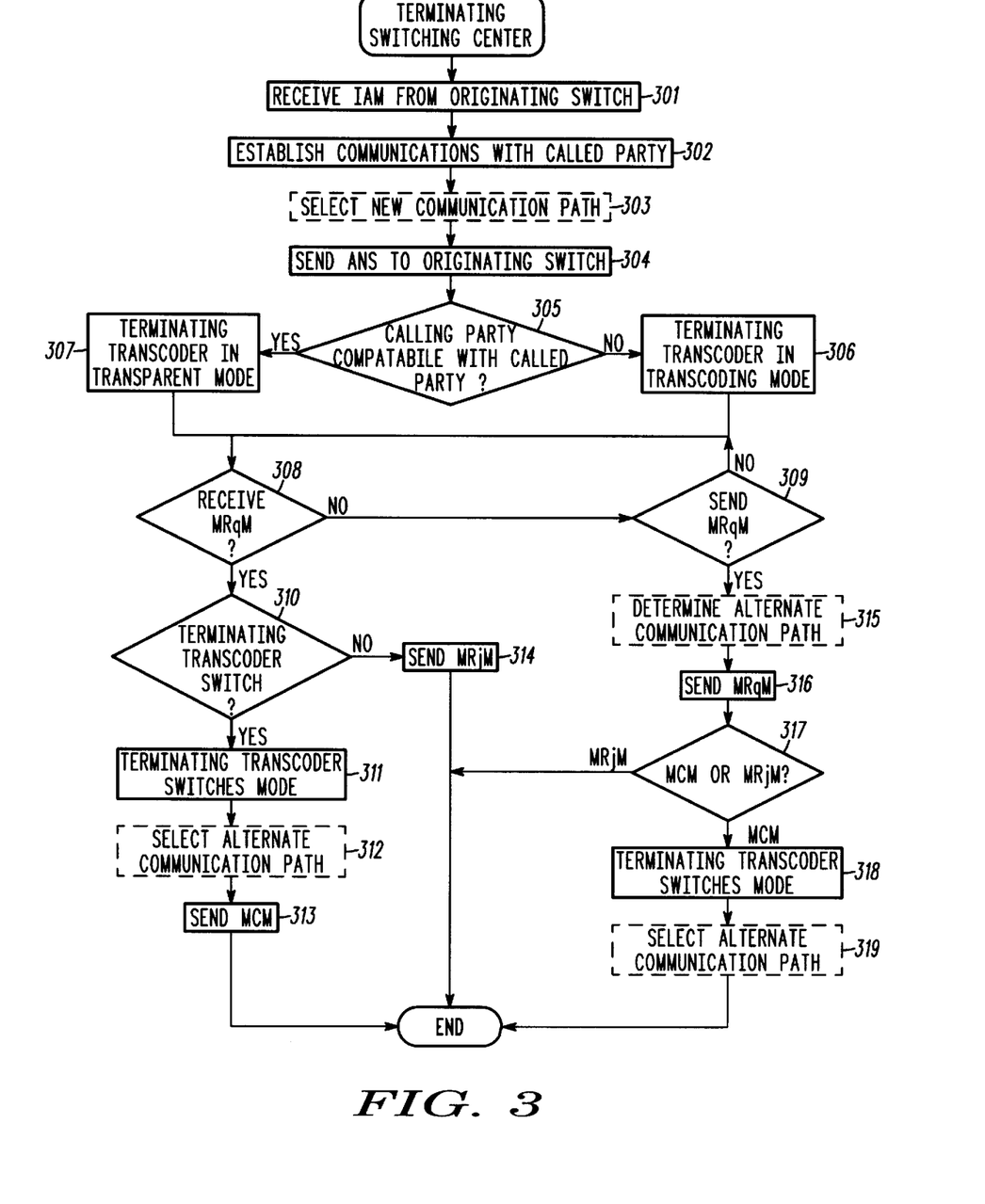
FIG. 3 is a flowchart of a method, in accordance with the present invention, for use by a terminating switching center.

FIG. 3 is a flowchart of a method, in accordance with the present invention, for use by a terminating switching center. For the purposes of discussion regarding FIG. 3 the following is assumed: the switching center identified by reference numeral 102 is the TSC, the transcoder identified by reference numeral 122 is the terminating transcoder, the switching center identified by reference numeral 101 is the OSC, the mobile unit identified by reference numeral 118 is the calling party, and the mobile unit identified by reference numeral 119 is the called party.

At step 301, the TSC receives an IAM sourced by the OSC. The IAM includes an identity of the called party, a calling party category and, in the preferred embodiment, also includes a requested information transfer rate. As noted above, the OSC at this point will have established a full-bandwidth communication path between the OSC and the TSC in accordance with well-known techniques.

At step 302, the TSC establishes communications with the called party as identified by the IAM. Using the tables stored in its own memory, as well as those stored in local HLR's and/or VLR's, the TSC determines that the called party is a wireless mobile unit and attempts to establish communications through the wireless system using well-known techniques. Once communications have been established with the called party, and once it is known that the called party is a mobile unit, the TSC can optionally select a new communication path (i.e., other than the communication path originally identified to the TSC when receiving the IAM) at step 303. Because the TSC knows that the called party is a mobile unit, and because the calling party category indicates that the calling party is also some sort of mobile unit, the new communication path selected by the TSC will be a reduced-bandwidth communication path, assuming one is available.

At step 304, the TSC sends an ANS to the OSC. The ANS includes a called party category and, in the preferred embodiment, Et negotiated information transfer rate and a communication path identifier. As described above, the communication path identifier will correspond to the new communication path, if selected at step 303, or to the communication path originally established by the OSC.

In addition to sending the ANS, the TSC also determines whether the calling party is compatible, in the sense described above, with the called party at step 305. In practice, because it was determined earlier that the call was mobile-to-mobile, the terminating transcoder (assigned to this particular communication) will originally be configured in a transparent mode. However, if the calling party category is not compatible with the called party, the TSC will instruct the terminating transcoder to operate in a transcoding mode at step 306. If the calling party category is compatible with the called party, the TSC will instruct the terminating transcoder to operate in a transparent mode at step 307, if necessary. At this point, the TSC has identified the mobile-to-mobile nature of the communication through the use of the enhanced IAM and ANS. Additionally, the TSC has also identified a reduced-bandwidth communication path, if available, for use in the pending communication. Remaining steps 308–319 shown in FIG. 3 are equivalent in operation to steps 208–219 with the exception that the roles of the OSC and originating transcoder discussed above are switched with the respective roles of the TSC and terminating transcoder also discussed above. Thus, it can be seen that the present invention treats requests for modifications the same, regardless of the source of the request.

Figure 4A:
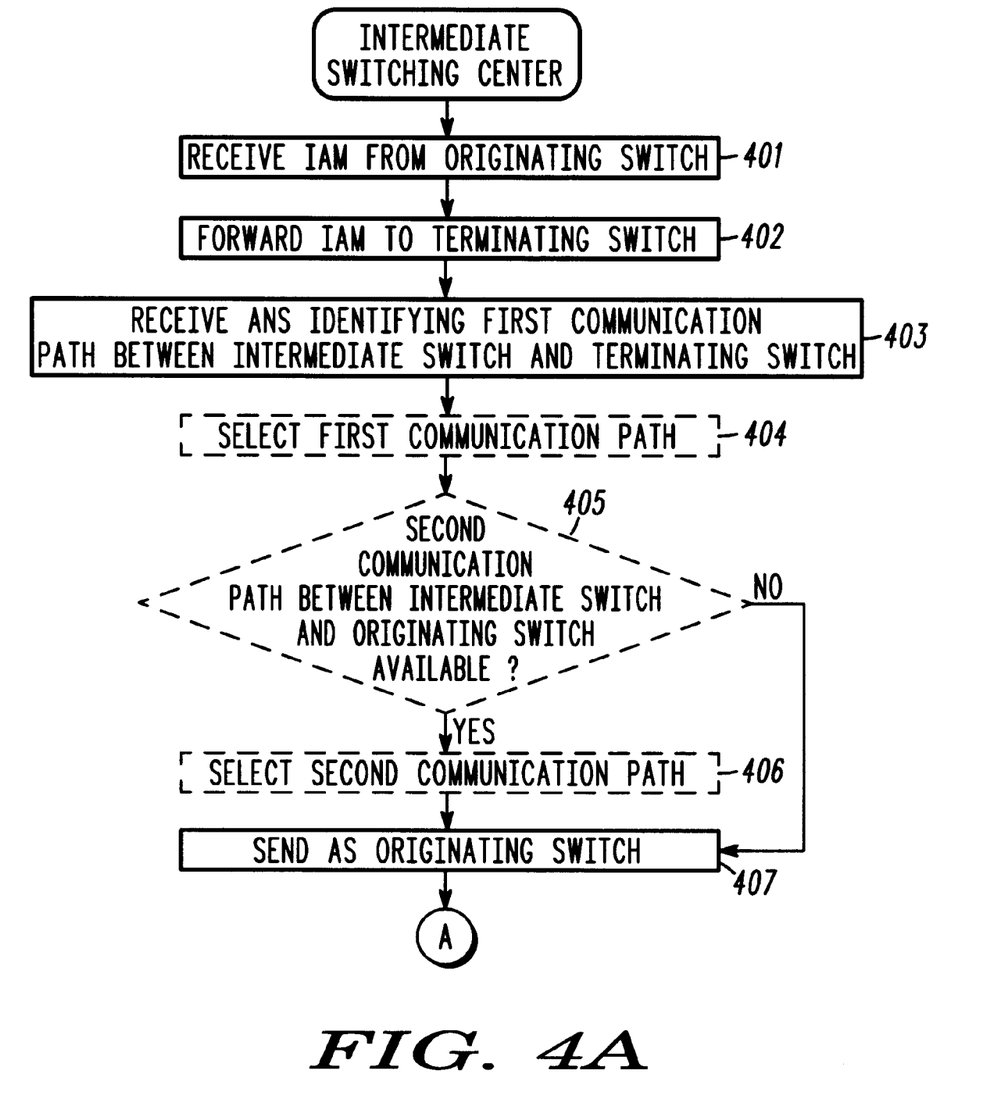
FIGS. 4A and 4B are a flowchart of a method, in accordance with the present invention, for use by an intermediate switching center.
Figure 4B:
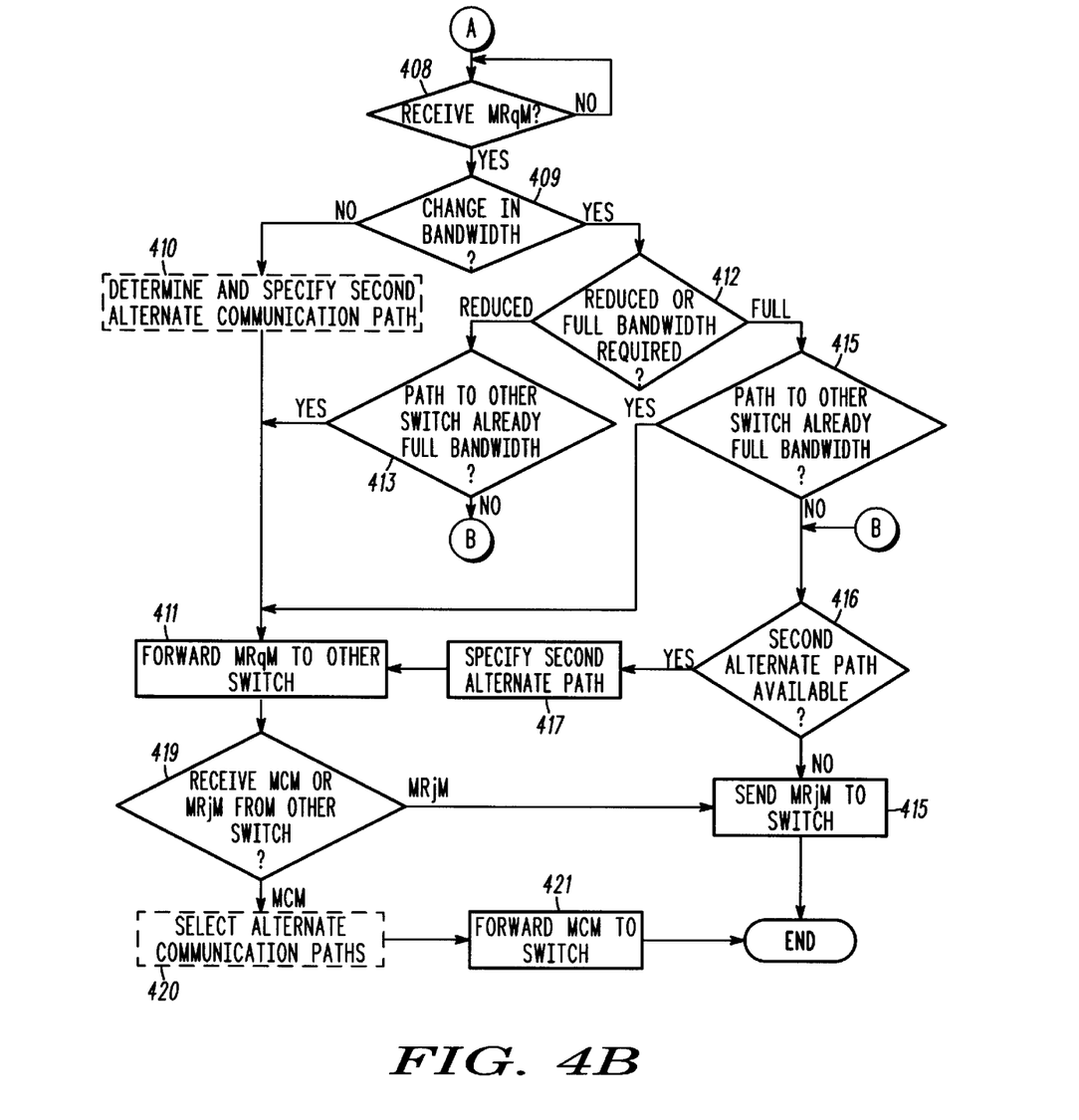

FIGS. 4A and 4B are a flowchart of a method, in accordance with the present invention, for use by an intermediate switching center. For the purposes of discussion regarding FIGS. 4A and 4B the following is assumed: the switching center identified by reference numeral 101 is the OSC, the switching center identified by reference numeral 103 is the TSC, the switching center identified by reference numeral 102 is the intermediate switching center (ISC), the mobile unit identified by reference numeral 118 is the calling party, and the mobile unit identified by reference numeral 120 is the called party.

At step 401, an IAM, as described above, is received from the OSC. The OSC also establishes a full-bandwidth (originating) communication path between the OSC and the ISC, the identity of which communication path is conveyed to the ISC. Recognizing that it is not the intended recipient of the IAM, the ISC will forward the IAM to the TSC at step 402. In forwarding the IAM to the TSC, the ISC establishes a communication path between the ISC and the TSC, which path is identified to the TSC. (This discussion assumes that the ISC has direct links to the TSC. It is understood that one or more additional intermediate switches may also be included in routing the IAM to the TSC. In such a case, each ISC involved will perform essentially the same operations as described hereinbelow, subject to the limitation that for any given ISC, other ISCs may take the role of the OSC and/or TSC.)

As discussed above, the TSC, after receiving the IAM, replies with an ANS, which ANS is received by the ISC at step 403. The ANS, in accordance with the discussion above, includes a communication path identifier corresponding to a first communication path. If the first communication path thus identified is the same communication path established by the ISC at step 402, no further action is required. However, if the first communication path is different from that previously established, the ISC optionally selects (switches to) the first communication path at step 404. In the preferred embodiment, the first communication path identified in the ANS will differ from the one established at step 402 only when the possibility for reduced-bandwidth communications has been identified by the TSC.

At step 405, responsive to the ANS, the ISC optionally determines whether a second communication path, having reduced-bandwidth capabilities, is available between the ISC and the OSC. If the first communication path discussed above is full-bandwidth because the call requires full-bandwidth (as determined by the requested and negotiated information transfer rates), then there would be no need to determine the availability of a reduced-bandwidth communication path between the ISC and the OSC. However, if the first communication path is full-bandwidth but the requested and negotiated information transfer rates indicate the potential to use a reduced-bandwidth path, then step 405 would be executed in order to realize bandwidth savings between the ISC and the OSC. Techniques for such a determination are well-known in the art. If the second communication path having reduced-bandwidth capabilities is not available, the ISC sends the ANS to the OSC at step 407, but adjusts the communication path identifier included in the ANS to correspond to the identity of the originating communication path (see step 401 above) between the ISC and the OSC. If the second communication path is available, the ISC selects (switches to) the second communication path at step 406 and then proceeds to step 407, at which step the ANS is sent to the OSC with the communication path identifier adjusted to correspond to the second communication path. Once the ANS is received by the OSC, the OSC can proceed in accordance with the methods described above.

As a result of steps 401–407, the ISC facilitates the elimination of double transcoding as well as the use of reduced-bandwidth resources when possible. Additionally, the present invention allows the ISC to also accommodate the need for changes in call configurations. At step 408, the ISC determines if it has received a MRqM, as described above, from one of either the OSC and the TSC (hereinafter referred to as "the switch") destined for the other of the OSC and the TSC (hereinafter referred to as "the other switch"). As described above, any MRqM received by the ISC will include a modified configuration indicator and, optionally, a called/calling party category, an alternate information transfer rate and/or a first alternate communication path identifier corresponding to a first alternate communication path between the switch and the ISC. The first alternate communication path, when identified, may be either a reduced-bandwidth or full-bandwidth communication path depending upon the nature of the modified configuration indicator and the alternate information transfer rate.

If a MRqM is received, the ISC determines at step 409 whether the bandwidth requirements for the call have changed in light of the MRqM. To this end, the ISC can first determine whether the modified configuration indicator indicates a change in configuration (e.g., a "wireless to wireline" or "wireline to wireless" transition) such that the bandwidth requirement for the call needs to be altered. Furthermore, the alternate information transfer rate will indicate the minimum required bandwidth for the call in light of the requested modification. If the alternate information transfer rate included in the MRqM does not match the current information transfer rate (as indicated by the requested and negotiated information transfer rates exchanged when the call was originally set up), then the ISC is alerted to the change in bandwidth requirements. It is noted that any change in bandwidth requirements could be either an increase or a decrease in bandwidth.

Presuming that no change in bandwidth is detected, the ISC can optionally determine, at step 410, the availability of a second alternate communication path between the ISC and the other switch. In particular, this would be done when the ISC determines: (i) that the communication path between the other switch (i.e., the switch that the MRqM is being sent to) and the ISC is full-bandwidth; and (ii) that the modified configuration indicator and/or the alternate information transfer rate indicate that the requested call configuration only requires reduced-bandwidth. Because no more than reduced-bandwidth is required for the call, the MRqM presents the ISC with the opportunity to reduce the bandwidth being used between the ISC and the other switch. That is, although the full-bandwidth communication path between the other switch and the ISC could be used to complete the call, it would be a better use of resources if a reduced-bandwidth communication path between the ISC and the other switch were used. If such a situation is present and the ISC determines that such a communication path is available, the ISC will forward the MRqM, at step 410, to the other switch with the second alternate (reduced-bandwidth) communication path specified. Conversely, if such a situation is not present (i.e., step 410 is not executed) or if the ISC cannot find an available reduced-bandwidth communication path, then the MRqM is forwarded to the other switch at step 411. In either case, the modified configuration indicator and the alternate information transfer rate are included in the MRqM forwarded at step 411.

If a change in required bandwidth is detected, the ISC further determines whether full or reduced-bandwidth is required at step 412. The full/reduced requirement is reflected by the alternate information transfer rate specified in the MRqM.

Furthermore, the first alternate communication path specified in the MRqM will be of a type at least compatible with (e.g., a full-bandwidth path for reduced-bandwidth communications), if not corresponding to, the alternate information transfer rate.

If reduced-bandwidth communications are required, it is determined at step 413 whether the communication path between the ISC and the other switch is already reduced-bandwidth such that the minimum required bandwidth specified by the alternate information transfer rate is available. If so, no changes are required between the ISC and the other switch, and the MRqM is forwarded at step 411. Similarly, if full-bandwidth communications are required, it is determined at step 415 whether the communication path between the ISC and the other switch is already full-bandwidth. If so, no changes are required between the ISC and the other switch, and the MRqM is forwarded at step 411.

If reduced-bandwidth communications are required and the communication path between the ISC and the other switch is not already reduced-bandwidth (step 413), or if full-bandwidth communications are required and the communication path between the ISC and the other switch is not already full-bandwidth (step 415), it is determined at step 416 whether a second alternate communication path is available between the ISC and the other switch. The type of second alternate communication path determined depends upon the bandwidth requirement ascertained at step 412. Thus, if step 416 is arrived at via step 413, the availability of the second alternate communication path is based on the availability of reduced-bandwidth paths between the ISC and the other switch. Conversely, if step 416 is arrived at via step 415, the availability of the second alternate communication path is based on the availability of full-bandwidth paths between the ISC and the other switch.

If the second alternate communication path of the type required is not available, the ISC sends a MRjM to the switch at step 418, thereby terminating the modification request. However, if the second alternate communication path of the type required is available, the second alternate communication path is specified, at step 417, in the MRqM, which is then forwarded to the other switch at step 411.

Regardless of the conditions under which the MRqM was forwarded to the other switch, the ISC will receive, at step 419, either a MCM or a MRjM from the other switch. If a MRjM is received, the ISC forwards the MRjM to the switch at step 418, again terminating the modification request. If, however, a MCM is received, any alternate communication paths previously determined (i.e., at steps 410 or 416–417) are selected (switched to) by the ISC at step 420. To complete the requested modification, the MCM is then forwarded to the switch at step 421. Using the process described above, the ISC facilitates the present's invention's ability to establish and/or modify calls such that efficient resource usage is achieved.

The present invention provides a method in which multiple switching centers communicate with each other, thereby eliminating the need for multiple format conversions as well allowing the selection of resources that best accommodate the needs for a particular communication. This is achieved through the use of a novel set of control messages which allow multiple switching centers to detect the occurrence of mobile-to-mobile calls. Furthermore, the control messages allow the present invention to accommodate necessary changes in call configurations and thereby take advantage of opportunities to use communication resources more efficiently.

We claim:

1. In a wireless communication system that comprises at least an originating switching center in communication with a terminating switching center, wherein the terminating switching center is in communication with at least one terminating transcoder, a method executed by the terminating switching center to performn call set-up between the originating switching center and the terminating switching center, the method comprising steps of:

receiving from the originating switching center, via a first communication path, an initial address message that includes a calling party category;

establishing communications with a wireless unit indicated by the initial address message;

determining a called party category corresponding to the wireless unit;

determining, based on the calling party category and the called party category, an optional second communication path for communications between the terminating switching center and the originating switching center, the second communication path having a bandwidth that is less than a bandwidth of the first communication path;

selecting the second communication path for communications between the originating switching center and the terminating switching center; and instructing the at least one terminating transcoder to operate in a transparent mode after the step of establishing communications and when the calling party category is compatible with the called party category corresponding to the wireless unit.

2. The method of claim 1, wherein the initial address message further includes a requested information transfer rate.

3. The method of claim 1, further comprising a step of:

sending to the originating switching center, after the step of establishing communications, an answer message comprising the called party category, a negotiated information transfer rate, and a communication path identifier.

4. The method of claim 3, further comprising, after the step of establishing communications and prior to the step of sending the answer message, the step of:

setting the communication path identifier to correspond to the second communication path.

5. The method of claim 1, further comprising a step of:

instructing the at least one terminating transcoder to operate in a transcoding mode when the calling party category is not compatible with the called party category.

6. The method of claim 1, further comprising steps of:

receiving from the originating switching center a modification request message comprising a modified configuration indicator, an alternate communication path identifier, and an alternate information transfer rate;

determining, responsive to the modified configuration indicator, whether the at least one terminating transcoder can switch to a transcoding mode; and selecting a communication path identified by the alternate communication path identifier when it is determined that the at least one terminating transcoder can switch.

7. The method of claim 6, further comprising a step of:

sending to the originating switching center a modification complete message comprising the modified configuration indicator, the alternate communication path identifier, and the alternate information transfer rate when it is determined that the at least one terminating transcoder can switch.

8. The method of claim 1, further comprising a step of:

sending to the originating switching center a modification request message comprising a modified configuration indicator, an alternate communication path identifier, and an alternate information transfer rate.

9. The method of claim 8, further comprising steps of:

receiving from the originating switching center a modification complete message comprising the modified configuration indicator, the alternate communication path identifier and the alternate information transfer rate;

switching the at least one terminating transcoder to a transcoding mode responsive to the modification complete message; and selecting a communication path identified by the alternate communication path identifier responsive to the modification complete message.

10. In a wireless communication system that comprises at least an originating switching center in communication with a terminating switching center, wherein the originating switching center is in communication with at least one originating transcoder, a method executed by the originating switching center to perform call set-up between the originating switching center and the terminating switching center, the method comprising steps of:

receiving a call request;

sending to the terminating switching center, responsive to the call request and via a first communication path, an initial address message that includes a calling party category;

receiving from the terminating switching center an answer message that includes a called party category;

determining, based on the calling party category and the called party category, an optional second communication path for communications between the originating switching center and the tenninating switching center, the second communication path having a bandwidth that is less than a bandwidth of the first communication path;

selecting the second communication path for communications between the originating switching center and the terminating switching center; and instructing the at least one originating transcoder to operate in a transparent mode when the balling party category is compatible with the called party category.

11. The method of claim 10, wherein the initial address message further includes a requested information transfer rate.

12. The method of claim 10, wherein the answer message further includes a negotiated information transfer rate and a communication path identifier, wherein the communication path identifier corresponds to the second communication path.

13. The method of claim 12, further comprising steps of:

determining that the communication path identifier corresponds to a new communication path having reduced-bandwidth; and selecting the new communication path.

14. The method of claim 10, further comprising a step of:

instructing the at least one originating transcoder to operate in a transcoding mode when the calling party category is not compatible with the called party category.

15. The method of claim 10, further comprising steps of:

receiving from the terminating switching center a modification request message comprising a modified configuration indicator, an alternate communication path identifier, and an alternate information transfer rate;

determining, responsive to the modified configuration indicator, whether the at least one originating transcoder can switch to a transcoding mode; and selecting a communication path identified by the alternate communication path identifier when it is determined that the at least one originating transcoder can switch.

16. The method of claim 15, further comprising a step of:

sending to the terminating switching center a modification complete message comprising the modified configuration indicator, the alternate communication path identifier, and the alternate information transfer rate when it is determined that the at least one originating transcoder can switch.

17. The method of claim 10, further comprising a step of:

sending to the tenninating switching center a modification request message comprising a modified configuration indicator, an alternate communication path identifier, and an alternate information transfer rate.

18. The method of claim 17, further comprising steps of:

receiving from the terminating switching center a modification complete message comprising the modified configuration indicator, the alternate communication path identifier and the alternate information transfer rate;

switching the at least one originating transcoder to a transcoding mode responsive to the modification complete message; and selecting a communication path identified by the alternate communication path identifier responsive to the modification complete message.

19. In a wireless communication system that comprises at least an originating switching center in comnmunication with a terminating switching center via an intermediate switching center, a method executed by the intermediate switching center to perform call set-up between the originating switching center and the terminating switching center, the method comprising steps of:

receiving from the originating switching center, via a first communication path, an initial address message;

forwarding to the terminating switching center, via a second communication path, the initial address message;

receiving from the terminating switching center, via the second communication path and responsive to the initial address message, an answer message that includes a communication path identifier corresponding to an optional third communication path for communications between the intermediate switching center and the terminating switching center, the third communication path having a bandwidth that is less than a bandwidth of the second communication path; and selecting the third communication path for communications between the intermediate switching center and the terminating switching center.

20. The method of claim 19, further comprising steps of:

determining whether a fourth communication path having a bandwidth that is less than the first communication path is available between the intermediate switching center and the originating switching center;

selecting the fourth communication path when the fourth communication path is available; and sending to the originating switching center the answer message comprising a communication path identifier corresponding to the fourth communication path.

21. The method of claim 19, further comprising steps of:

receiving from one of the originating switching center and the terminating switching center a modification request message comprising a modified configuration indicator;

determining whether a fourth communication path is available between the intermediate switching center and an other one of the originating switching center and the terminating switching center; and forwarding to the other one of the originating switching center and the terminating switching center the modification request message comprising a communication path identifier corresponding to the fourth communication path.

22. The method of claim 21, further comprising steps of:

receiving from the other one of the originating switching center and the terminating switching center a modification complete message; and selecting the fourth communication path responsive to the modification complete message.

23. The method of claim 22, further comprising steps of:

selecting a fifth communication path between the intermediate switching center and the one of the originating switching center and the terminating switching center; and forwarding to the one of the originating switching center and the terminating switching center the modification complete message comprising a communication path identifier corresponding to the fifth communication path.

24. In a wireless communication system that comprises at least an originating switching center in communication with a terminating switching center, wherein the terminating switching center is in communication with at least one terminating transcoder, a method for the terminating switching center to perform call set-up between the originating switching center and the terminating switching center, the method comprising steps of:

receiving from the originating switching center an initial address message comprising a calling party category;

establishing communications with a wireless unit indicated by the initial address message;

instructing the at least one terminating transcoder to operate in a transparent mode after the step of establishing communications and when the calling party category is compatible with a called party category corresponding to the wireless unit;

receiving from the originating switching center a modification request message comprising a modified configuration indicator, an alternate communication path identifier, and an alternate information transfer rate;

determining, responsive to the modified configuration indicator, whether the at least one terminating transcoder can switch to a transcoding mode; and selecting an alternate communication path identified by the alternate communication path identifier when it is determined that the at least one terminating transcoder can switch.

25. The method of claim 24, further comprising the step of:

sending to the originating switching center a modification complete message comprising the modified configuration indicator, the alternate communication path identifier, and the alternate information transfer rate when it is determined that the at least one terminating transcoder can switch.

26. In a wireless communication system that comprises at least an originating switching center in communication with a terminating switching center, wherein the terminating switching center is in communication with at least one terminating transcoder, a method for the terminating switching center to perform call set-up between the originating switching center and the terminating switching center, the method comprising steps of:

receiving from the originating switching center an initial address message comprising a calling party category;

establishing communications with a wireless unit indicated by the initial address message;

instructing the at least one terminating transcoder to operate in a transparent mode after the step of establishing communications and when the calling party category is compatible with a called party category corresponding to the wireless unit;

sending to the originating switching center a modification request message comprising a modified configuration indicator, an alternate communication path identifier, and an alternate information transfer rate;

receiving from the originating switching center a modification complete message comprising the modified configuration indicator, the alternate communication path identifier, and the alternate information transfer rate;

switching the at least one terminating transcoder to a transcoding mode responsive to the modification complete message; and selecting an alternate communication path identified by the alternate communication path identifier responsive to the modification complete message.

27. In a wireless communication system that comprises at least an originating switching center in communication with a terminating switching center, wherein the originating switching center is in communication with at least one originating transcoder, a method for the originating switching center to perform call set-up between the originating switching center and the terminating switching center, the method comprising steps of:

receiving a call request;

sending to the terminating switching center responsive to the call request an initial address message comprising a calling party category;

receiving from the terminating switching center an answer message comprising a called party category;

instructing the at least one originating transcoder to operate in a transparent mode when the calling party category is compatible with the called party category;

receiving from the terminating switching center a modification request message comprising a modified configuration indicator, an alternate communication path identifier, and an alternate information transfer rate;

determining, responsive to the modified configuration indicator, whether the at least one originating transcoder can switch to a transcoding mode; and selecting an alternate communication path identified by the alternate communication path identifier when it is determined that the at least one originating transcoder can switch.

28. The method of claim 27, further comprising the step of:

sending to the terminating switching center a modification complete message comprising the modified configuration indicator, the alternate communication path identifier, and the alternate information transfer rate when it is determined that the at least one originating transcoder can switch.

29. In a wireless communication system that comprises at least an originating switching center in communication with a terminating switching center, wherein the originating switching center is in communication with at least one originating transcoder, a method for the originating switching center to perform call set-up between the originating switching center and the terminating switching center, the method comprising steps of:

receiving a call request;

sending to the terminating switching center responsive to the call request an initial address message comprising a calling party category;

receiving from the terminating switching center an answer message comprising a called party category;

instructing the at least one originating transcoder to operate in a transparent mode when the calling party category is compatible with the called party category;

sending to the terminating switching center a modification request message comprising a modified configuration indicator, an alternate communication path identifier, and an alternate information transfer rate;

receiving from the terminating switching center a modification complete message comprising the modified configuration indicator, the alternate communication path identifier, and the alternate information transfer rate;

switching the at least one originating transcoder to a transcoding mode responsive to the modification complete message; and selecting an alternate communication path identified by the alternate communication path identifier responsive to the modification complete message.

* * * * *

UNITED STATES PATENT AND TRADEMARK OFFICE
CERTIFICATE OF CORRECTION

PATENT NO. : 5,987,327

DATED : November 16, 1999

INVENTOR(S) : Lev et al.

It is certified that error appears in the above-identified patent and that said Letters Patent is hereby corrected as shown below:

Column 15, line 46 reads claim number "19" should be -- 18 --.

Column 16, line 4 reads claim number "20" should be -- 19 --.

Column 16, line 14 reads claim number "21" should be -- 20 --.

Column 16, line 14 reads "The method of claim 19" should be -- The method of claim 18 --.

Column 16, line 27 reads claim number "22" should be -- 21 --.

Column 16, line 27 reads "The method of claim 21" should be -- The method of claim 20 --.

Column 16, line 33 reads claim number "23" should be -- 22 --.

Column 16, line 33 reads "The method of claim 22" should be -- The method of claim 21 --.

Column 16, line 43 reads claim number "24" should be -- 23 --.

Column 17, line 5 reads claim number "25" should be -- 24 --.

Column 17, line 5 reads "The method of claim 24" should be -- The method of claim 23 --.

UNITED STATES PATENT AND TRADEMARK OFFICE
CERTIFICATE OF CORRECTION

PATENT NO. : 5,987,327
DATED : November 16, 1999
INVENTOR(S) : Lev et al.

It is certified that error appears in the above-identified patent and that said Letters Patent is hereby corrected as shown below:

Column 17, line 13 reads claim number "26" should be -- 25 --.

Column 17, line 46 reads claim number "27" should be -- 26 --.

Column 18, line 15 reads claim number "28" should be -- 27 --.

Column 18, line 15 reads "The method of claim 27" should be -- The method of claim 26 --.

Column 18, line 23 reads claim number "29" should be -- 28 --.

Signed and Sealed this

Tenth Day of April, 2001

Attest:

NICHOLAS P. GODICI

Attesting Officer

Acting Director of the United States Patent and Trademark Office